Feb. 18, 1930.  T. V. HEMMINGSEN  1,747,935
FUEL VALVE FOR INTERNAL COMBUSTION ENGINES
Filed July 5, 1927
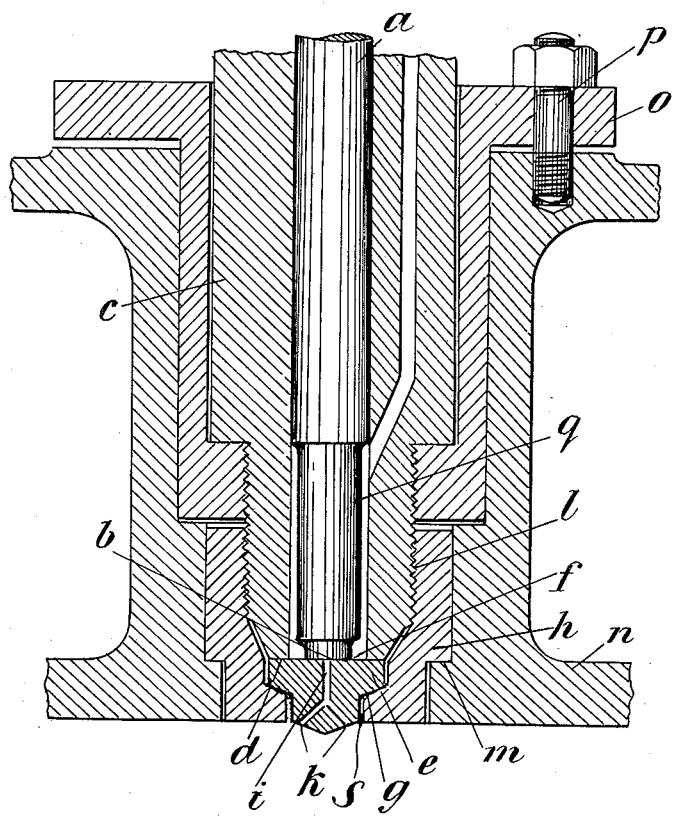
INVENTOR
Torkild V. Hemmingsen
by
Langner, Parry, Card and Langner
Att'ys.

Patented Feb. 18, 1930

1,747,935

UNITED STATES PATENT OFFICE

TORKILD VALDEMAR HEMMINGSEN, OF COPENHAGEN, DENMARK

FUEL VALVE FOR INTERNAL-COMBUSTION ENGINES

Application filed July 5, 1927, Serial No. 203,649, and in Denmark May 6, 1927.

This invention relates to a fuel valve for internal combustion engines of the type in which the fuel oil is forced directly into the cylinder by means of pressure produced by a fuel pump driven by the engine, without injection of air being employed for this purpose.

In fuel valves of this type, the admission of the fuel to the cylinder takes place through an oil channel or passage in a spraying nozzle, and the valve opens the oil channel when the pressure on the oil reaches a sufficient height, in that the pressure acts on the annular area constituted by the difference between the area of the valve seat and the cross section area of the valve spindle, thereby overcoming the tension of a spring which normally keeps the valve closed. In valves of this type it is difficult, on account of the height of the pressure, to make the valve absolutely tight against its seat and to maintain tightness during the working of the engine. Another difficulty lies in the problem of designing the valve in such a manner that it is possible to replace the spraying nozzle when necessary, without this operation necessitating grinding in of the new valve parts with the old parts, as this can only be done by specially trained workmen. Finally it is difficult to perform the clamping in position of the valve chamber in such a manner that the deformation caused by the clamping operations does not influence the tight fit of the valve and the capacity for free movement of the valve spindle. It has been tried to solve these difficulties by making the valve spindle yielding or flexible in relation to its axis so that the end surface of the valve spindle may adjust itself to the inner surface of the spraying nozzle and the valve at the same time retain its capacity for free and easy movement in the valve chamber, even if this latter is deformed to some extent. The hitherto known valves have been of such a construction that whether they were provided with two flat seating faces ground into each other for closing the oil channel in the fuel nozzle, or whether they were made to operate by means of two conical surfaces ground into each other, they have been incapable of meeting the demands for complete tightness, laid down in the above-mentioned conditions.

Another important feature in the construction of these valves is that the spraying nozzle, which serves to distribute the fuel oil, received from a single channel or pipe line, through a number of minute openings, must be made in such a way that the oil passage therein is as short as possible.

It is further of importance that the spraying nozzle is mounted in the valve in such a manner that the hammering action of the valve spindle will not cause the seat to become detached and drop into the cylinder.

The present invention provides a valve of such a construction that all the drawbacks mentioned above are avoided.

The drawing illustrates a constructional form of the invention, the figure showing a valve constructed in accordance with the invention, in longitudinal sectional view.

The reference character $a$ indicates the valve spindle, which is provided at its bottom end with a flat seat $b$ ground into a true flat at a right angle to the valve spindle axis, $c$ is the valve chamber which is provided with a cylindrical drilled hole in which the valve spindle $a$ fits accurately and a seat $d$ ground accurately at a right angle to the drilled hole in the valve chamber. $e$ is the spraying nozzle whose uppermost surface $f$ is ground into a true flat.

The spraying nozzle $e$ is provided with a spherical surface $g$, corresponding to a spherical surface in the nut $h$ by means of which the spraying nozzle $e$ is clamped against the valve chamber $c$, whereby it is ensured that the spraying nozzle $e$ is clamped in an even manner against the seat $d$. The nozzle $e$ is provided with an oil passage $i$ which is opened and closed by the valve spindle $a$. Smaller passages or channels $k$ serve to distribute the oil sprays in the combustion chamber. The nut $h$ for clamping the nozzle $e$ is threaded at $l$ and screwed on to the valve chamber $c$, and this nut forms the bottom part of the fuel valve housing. The nut $h$ is further provided with a seat $m$ which is pressed against a corresponding projection, formed in the cylinder cover $n$, when the valve chamber is clamped in position, thereby ensuring tightness for the working pressure in the cylinder against the outer atmosphere. In constructing the valve as described above it is obtained that neither the spraying nozzle nor the nut can become detached and drop into the cylinder.

In order to ensure the necessary degree of tightness the valve chamber must be clamped in position with considerable force and, as already mentioned in the introduction, it is of importance that this clamping operation does not affect the valve chamber $c$, which, if influenced in any way, may be subjected to a deformation. Even though this deformation normally is very insignificant it may still be sufficiently large to be detrimental to the absolute tightness between the two flat seats, namely, the seat $b$ on the valve spindle $a$ and the seat $f$ on the nozzle $e$, and it may further cause the valve spindle to seize in the drilled hole in the valve chamber $c$. To overcome this difficulty the fuel valve is provided, according to the shown constructional form, with a clamping piece $o$ which is fastened to the cylinder cover $n$ by means of the screws $p$. This clamping piece is threaded at the bottom end and screwed on to the threads $l$ so that the actual clamping in position takes place at the bottom portion of the valve chamber $c$, the valve spindle being here provided with a set back portion $q$ with a smaller diameter than the rest of the spindle fitting into the drilled hole in the valve chamber.

In this way the clamping force is transferred through a portion of the valve chamber which is too short to allow for any substantial deformation of the latter, and, moreover, the valve spindle clears the walls in the drilled hole in the valve chamber at this portion of its length.

It must be mentioned that, with regard to the above-mentioned flat faces $f$, $b$ and $d$, it is possible with the use of modern machinery to perform, with the utmost exactitude, the flat face $f$ on the spraying nozzle $e$, and also to grind the faces $b$ and $d$ into accurately true flats exactly at right angles to the axis of the valve spindle $a$ and the drilled hole in the valve chamber $c$ respectively. In this way it becomes possible to manufacture the parts wholesale, so that any spraying nozzle $e$ may be fitted and produce absolute tightness without any grinding operations being necessary.

The invention is not restricted to comprise only the constructional form shown and described above, and may be modified in many different ways without thereby departing from the principles of the invention.

I claim:

1. An improved fuel valve for internal combustion engines of the type operating with direct injection of fuel, comprising a valve guide having a flat end, a spraying nozzle abutting the flat end of said guide to make a fluid tight joint therewith, securing means by which said nozzle is pressed into contact with the flat end of said guide, said nozzle and securing means being so constructed as to leave the nozzle freely rotatable in all directions under pressure of said securing means, to find a perfect seat against said guide.

2. An improved fuel valve for internal combustion engines as claimed in claim 1, the upper face of said nozzle being formed with a single flat surface.

3. An improved valve for internal combustion engines as claimed in claim 1, including a valve spindle in said guide having a flat end parallel to the plane of the end of the valve guide.

4. An improved fuel valve for internal combustion engines of the type operating with direct injection of fuel, comprising a valve guide having a flat end, a spraying nozzle abutting the flat end of said guide to make a fluid tight joint therewith, securing means by which said nozzle is pressed into contact with the flat end of said guide, said nozzle and securing means being formed with coengaging spherical surfaces whereby said nozzle may shift under pressure of said securing means to find a perfect seat against said guide.

In testimony whereof I affix my signature.

TORKILD VALDEMAR HEMMINGSEN.